No. 659,409. Patented Oct. 9, 1900.
C. L. MOSHER.
ELECTRIC BIPOLAR DILATOR.
(Application filed Aug. 25, 1900.)
(No Model.)
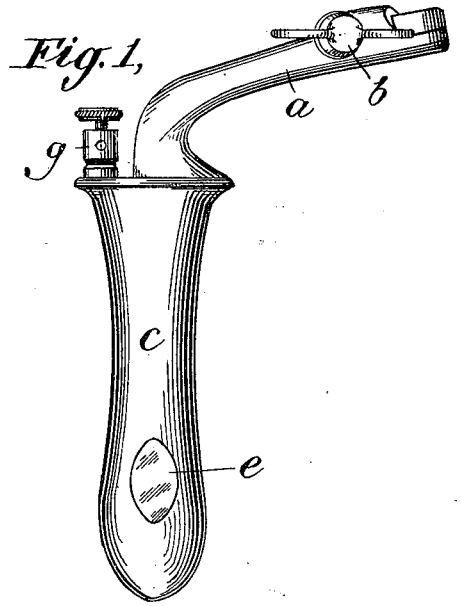
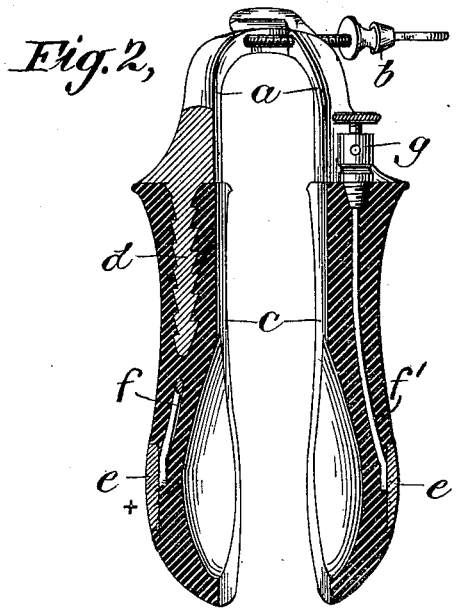
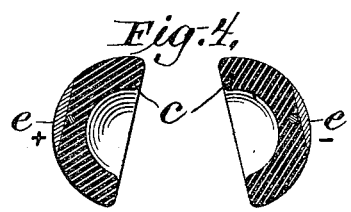
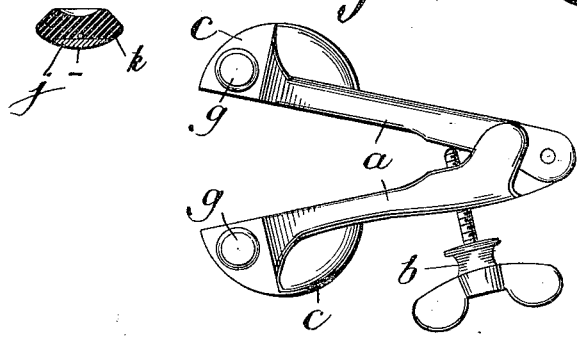
WITNESSES:
D. N. Naysmith
M. Nifow.
INVENTOR
Charles L. Mosher
BY Alfred Shedlock
ATTORNEY
THE NORRIS PETERS CO., PHOTO-LITHO., WASHINGTON, D. C.

UNITED STATES PATENT OFFICE.

CHARLES L. MOSHER, OF CHATHAM, NEW YORK.

ELECTRIC BIPOLAR DILATOR.

SPECIFICATION forming part of Letters Patent No. 659,409, dated October 9, 1900.

Application filed August 25, 1900. Serial No. 28,024. (No model.)

*To all whom it may concern:*

Be it known that I, CHARLES L. MOSHER, a citizen of the United States, and a resident of Chatham, county of Columbia, and State of New York, have invented certain new and useful Improvements in Electric Bipolar Dilators, of which the following is a specification.

This invention has for its object to provide means for the application of electric currents to the canals or discharge-passages of the body in such manner that the current will pass through and act upon only such parts as require electric treatment.

To this end the invention contemplates providing expanding surgical instruments, such as are known as "dilators"—as, for instance, rectal dilators—with bipolar insulated plates or poles adapted to be placed in connection with the terminals of a battery or other source of electrical supply, so that the completion of the circuit is had through the portion or portions of the wall of the canal from the one pole or set of poles to the other pole or set of other poles which are carried by the blades or valves of the dilator, thus obtaining the full benefit of the electric current at the parts under treatment, which parts may be distended as desired during such electrical treatment by the expansion of the dilator.

The plates or poles applied to the blades or valves of the dilators according to my invention will be preferably located near their ends or so far from the bases of the blades or valves as not to contact with the sphincter-muscles. The blades or valves may be made solely of insulating material, with the contact plates or poles embedded therein, or they may be made of metal, the contact plates or poles being suitably insulated and connected thereto, or the blades or valves may be made of metal having insulated pivotal connections and having their base portions or such parts as may lie within the sphincter-muscles properly protected by a suitable insulation. In a dilator having two blades or valves each blade will constitute or be provided with a pole forming the terminal of a battery. In dilators having three or more blades two blades only may constitute or be provided with a pole, or the two terminals of the battery may be placed in multiple connection with two or more blades.

To describe my invention more particularly, I will now refer to the accompanying drawings, in which—

Figure 1 represents in side elevation a two-bladed or bivalve rectal dilator provided with my electrical bipolar improvement. Fig. 2 is an elevation at right angles to Fig. 1, showing one of the blades in central section and the other blade in section through the electrical connection. Fig. 3 is an end view looking toward the outer or hinged end of the instrument. Fig. 4 is a transverse sectional view of the portions of the blade of a bivalve dilator at which the electrical contact-poles are located, and Fig. 5 is a view similar to Fig. 4 of a dilator having four blades.

As here shown my invention is applied to a rectal dilator, which, in so far as the hinged connection $a$ and separating-screw $b$ is concerned, is of ordinary construction, and it will be understood that any of the existing or suitable means for the separation of the blades of a multibladed dilator may be employed in actuating the blades shown at Fig. 5. The blades or valves $c$ $c$ are shown in the drawings as composed of hard rubber or other suitable insulating material suitably secured to the shanks $d$ $d$ of the metallic hinged portion of the instrument by being molded thereon or otherwise connected thereto. In the sides of and at or near the inner ends of the blades $c$ $c$ are embedded the electrical contact plates or poles $e$ $e$ in such manner that their outer surfaces will be about flush with the surfaces of the blades, so that perfect contact of these poles with the surface or wall of the part being treated will be insured. These poles $e$ $e$ are by the wires $f$ $f$ connected to the binding-posts $g$ $g$, attached to the outer ends of the blades, and by means of which connections may be made to an electric battery or other source of electric supply, so that each one of the poles $e$ $e$ will constitute a terminal of such battery or source of electrical supply, to indicate which these poles are respectively marked "$+$" and "$-$."

As before indicated, it will be readily seen that by the use of an instrument of the character shown the full energy of the electrical current and thereby increased beneficial effect will be had at the exact parts it is desired to treat, as the current will pass from one pole $e$ to the other through such parts of the canal as completes the electric circuit or circuits, and such electrical action may be had while said canal is distended more or less, as desirable, by the spreading apart of the blades of the instrument.

It will be noted that the application of electric current is considered undesirable to the sphincter-muscles through which the instrument is passed. So the poles $e$ $e$ will in all cases be so located on the blades as to be beyond the sphincter-muscles when the instrument is in the operative position, and the base portions of the blades lying within the sphincter-muscles will be suitably insulated from any of the electrical connections whatever material the blades may be composed of or whatever form the instruments provided with my improvement may take.

In multibladed dilators the electric contact-poles may be coupled or connected up to the battery in any desired manner. The view Fig. 5 gives the transverse section of the blades of a four-bladed instrument, showing one form in which the electrical connections may be made. Each pair of the poles $h$ $h$ of opposite blades $i$ $i$ and the poles $j$ $j$ of the opposite blades $k$ $k$, marked, respectively, "$+$" "$+$" and "$-$" "$-$," constitute the terminals of one of the two battery-poles.

The electric contact plates or poles and all insulated parts, in whatever form they may be, will be so closely and intimately attached to the blades as to avoid all openings or crevices, so that instruments may be as aseptic as possible.

Of course it will be understood that the contact-poles carried by the blades may be made in two or more parts, so as to cause the current to pass to or from two or more parts of the blades. Such modification and other modifications of construction here suggested it is thought unnecessary to illustrate.

I claim as my invention—

1. A rectal or other dilator the expanding-blades of which are provided with contact plates or poles adapted to be included in an electric circuit and constitute the terminals of a source of electrical supply.

2. A rectal or other dilator the expanding-blades of which are insulated at their base portions and have contact-poles at or near their ends separately constituting the terminals of a source of electrical supply.

3. A rectal or other dilator having electric contact plates or poles near the inner ends of the expanding-blades and means for connecting said contact plates or poles to a source of electrical supply to constitute the terminals thereof.

4. In a bipolar surgical instrument, two or more dilating-blades, insulated electric contact plates or poles on the blades and means for connecting two or more of the insulated lates or poles to the terminals of the source of electrical supply.

5. A rectal or other dilator having electric contact plates or poles near the ends of the expanding-blades, the base portions of the blades being insulated to avoid electrical contact with the sphincter-muscles, and means for connecting said contact plates or poles to a source of electrical supply to constitute the terminal thereof.

6. In a rectal or other dilator, blades formed of insulating material, hinged connections for the blades, means for forcing the blades apart, electric contact plates or poles carried by the blades, and means for connecting said plates or poles to the terminals of a source of electrical supply.

In testimony whereof I have hereunto subscribed my name this 22d day of August, 1900.

CHAS. L. MOSHER.

In presence of—
  CORNELIUS SHUFELT,
  CHARLES TREMAIN.